UNITED STATES PATENT OFFICE 2,459,111

PANTOYLTAURAMIDES AND PREPARATION OF THE SAME

Wilbur H. Miller, Springdale, and Richard O. Roblin, Jr., Riverside, Conn., assignors to American Cyanamid Company, New York, N. Y., a corporation of Maine No Drawing. Application November 24, 1945, Serial No. 630,696

11 Claims. (Cl. 260—251)

This invention relates to new organic compounds and to methods of preparing the same.

The new organic compounds of the present invention are pantoyltauramides having the general formula:

in which R is an aromatic, heterocyclic or alicyclic radical or such a radical attached to the amide nitrogen atom by an alkylene radical, such as a methylene radical when R represents an aralkyl radical like benzyl. In the formula X is hydrogen or a cationic salt-forming radical or an alkyl radical. These new compounds are prepared by reacting alpha-hydoxy-beta,beta-dimethyl-gamma-butyrolactone with an appropriate tauramide.

The new compounds are characterized, in general, by being white, crystalline solids, fairly soluble in water and more soluble in dilute solutions of alkalis. They are less soluble in aqueous solutions of acids. They are, in general, soluble in alcohols and other hyroxylated solvents.

The new compounds of the present invention possess surprising therapeutic activity, being active in the control of avian malaria and being effective in the control of streptococcal infections. In this latter capacity, they are more effective than sulfonamides, requiring smaller dosages and fewer of them. The mechanism of their action on Streptococci seems to be different than the action of sulfonamides, the bacterial count falling off immediately upon the application of a single dose of compound. These new compounds possess other advantages over the sulfonamides in that they are more water-soluble and do not tend to the formation of insoluble, crystalline compounds in the kidneys. They are easily administered orally and it is not difficult to obtain therapeutic levels in the blood stream.

As will be apparent from the structure of the compounds, they are subject to optical isomerism. Although the $d(+)$ form is the most active isomer, the optically inactive $d-1$ form possesses therapeutic activity and may be used in larger doses. The $d-1$ mixture is, of course, subject to resolution and the therapeutically inactive $1(-)$ form may be racemized.

The tauramides, possessing the structure

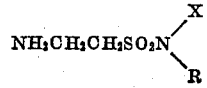

are also new compounds but their preparation from known materials is described in the specific examples. There are, of course, various methods of preparing these intermediates and the preparation by at least two methods is described.

The preferred method of preparing tauramides, which method has a more general applicability, involves the reaction of a phthaloyltauryl halide with an appropriate primary or secondary amine. This reaction is preferably carried out at a temperature between 0° and 75° C. in pyridine as the solvent. Water may be present in some cases. The reaction may also be carried out in organic solvents such as acetone in the presence of excess amounts of the amine. Ordinarily the reaction is complete in one to eight hours. The product of the reaction is a phthaloyltauramide. These compounds may be purified by recrystallization from their dilute solutions. They are characterized, in general, by having a high melting point and being difficultly soluble in most solvents.

The next step in the preferred synthesis of the tauramide intermediates is the splitting off of the phythaloyl residue. This may be accomplished by treating the phthaloyltauramides with 40% to 100% hydrazine hydrate in 50% to 100% alcohol and heating at the boiling point of the alcohol for from two to twenty-four hours. This procedure is preferred in those cases in which R in the general formula is a heterocyclic radical. When R is an aromatic radical of the benzene series, the cleavage of the phthaloyl residue may be accomplished by heating with caustic soda.

Another method of preparing the tauramides, particularly those in which R in the general formula is hydrogen or pyridine, involves the preparation of benzoyltauryl chloride by treatment of benzoyltaurine with thionyl chloride. The product is then reacted with ammonia or an aminopyridine to yield benzoyl tauramides. These products, on treatment with dilute caustic solution, yield the desired intermediate. This series of reactions is illustrated in Example 2 hereinafter.

The compounds of the present invention are obtained as previously stated, by the reaction of alpha-hydroxy-beta,beta-dimethyl-gamma-butyrolactone (referred to hereinafter as pantolactone for purposes of brevity) with a tauramide having the desired aromatic, alicyclic, or heterocyclic radicals attached to the amide nitrogen. This reaction may be caused to take place under several different conditions. One such process involves heating the reaction mixture in the vicinity of, either above or below, its melting point. The particular melting point in a given mixture depends, naturally, upon the particular tauramide employed. Ordinarily the melting point of most mixtures will be above 90° C. temperatures above about 150° C. should be avoided because of the tendency of the reaction mixture to decompose at temperatures of the order of 170° C. Also, racemization of the product may occur if excessive temperatures are employed when using optically active pantolactone. When preparing the products of the present invention by the fusion process the reaction will be found to be complete or at least substantially so within a period of from one to six hours. Illustrations of this procedure are given in the specific examples which follow.

The new compounds may also be prepared by heating under substantially anhydrous conditions the pantolactone and the tauramide in an organic solvent in the presence of a strongly alkaline substance. Substances which form water in the reaction mixture, such as potassium hydroxide, calcium hydroxide, sodium carbonate, etc., ammonia, and those primary and secondary amines which react with the lactone should be avoided. Suitable alkaline substances include calcium, and sodium amides, calcium carbide, metallic sodium and calcium, and the like. We prefer to use an alcoholic solution of the intermediates in the presence of an alkali metal or alkaline earth metal alkoxide. This reaction takes place at lower temperatures than the fusion process, from about 20° C. to the boiling point of the alcohol, but requires a longer period of time, from about three hours to one week. Obviously, if the reaction is conducted under pressure, temperatures up to 100° C. or higher may be employed. Various alcohols such as methyl, ethyl, propyl, butyl, etc. can be used. The alkoxide may correspond with the alcohol or it may not, as desired. Other solvents, preferably hydroxylated, such as ethylene glycols and their esters and ethers may also be used. The solvent selected should, of course, dissolve the reactants to a reasonable extent. As will appear, the reaction is subject to certain modifications which may be devised by those skilled in the art without departing from the essential features of novelty of the present invention.

As noted in the general formula, X may represent hydrogen. This hydrogen is acidic in nature and may be replaced by a cationic salt-forming radical by treatment of the product with an alkaline substance such as sodium hydroxide, potassium hydroxide, sodium carbonate, ammonia or amines such as morpholine, diethanolamine, ephedrine, piperidine, or the like. Cationic salts of the metals may be prepared by double-decomposition processes. Since the production of these salts is within the skill of the art, further discussion appears to be unnecessary.

As also noted, X may be an alkyl group. One such product is shown in Example 12. As will be seen, such products are obtained by using secondary amines in the preparation of the tauramide.

The letter R may represent a large variety of aromatic, heterocyclic, or alicyclic radicals. Among these are those of the benzene series in which the aromatic radical is a phenyl radical which may be substituted with one or more of bromine, chlorine, alkyls, alkoxys, nitro, nitrile, sulfonamide, and other radicals. Also included are those phenyl radicals substituted with alkylene radicals or unsaturated aliphatic radicals which may form a ring, as in the case of naphthalene. The aromatic radical may also be attached to the amide nitrogen by an alkylene group as shown in Example 20. Most of the final products having the group R, as defined, are obtained by the selection of an appropriate primary or secondary amine in the preparation of the intermediate tauramide. Representative products of the various types are illustrated in the specific examples.

Compounds in which R represent a heterocyclic radical are obtained by the use of a heterocylic amine in the preparation of the intermediate tauramide. Suitable aromatic heterocyclic amines include aminopyridine, aminopyrimidine, aminoquinoline, aminopyrazine, and the like. These heterocyclics may have a wide variety of halogen, alkyl, alkoxy, and other groups attached thereto. Also included are those compounds prepared from saturated heterocyclic amines such as piperazine, piperidine, etc. Alicyclic amines such as cyclohexylamine may be used to prepare suitable intermediates. Others will occur to those skilled in the art.

The invention will now be illustrated in greater particularity by means of the following specific examples. It should be understood that these examples are given to illustrate certain specific aspects of the invention and are not to be construed as being in limitation thereof. All parts are by weight unless otherwise indicated.

*Example 1*

Two portions of 24.4 parts of benzoyltaurine are each treated with 52 parts of thionyl chloride at 50° C. for 8¼ hours with occasional shaking. The reaction is stopped by the addition of 100 parts dry benzene and the two reaction mixtures are combined. Thionyl chloride is removed by distilling the benzenethionyl chloride mixture using a water bath at 35°–40° C. and vacuum followed by trituration of the solid with benzene which is then similarly removed. After repeating the last step, the residue is refluxed with benzene to dissolve the acid chloride away from insoluble residues. The filtrate is concentrated as above and the residue extracted with petroleum ether to remove chlorbenzimidoethane sulfonyl chloride. The product obtained, benzoyltauryl chloride, may be used as such or recrystallized from benzene to give a product melting at 87°–89° C.

Forty-three parts of benzoyltauryl chloride is dissolved in 140 parts of dry acetone. A solution of 40.4 parts of 2-aminopyridine in 140 parts of dry acetone is added with shaking. The mixture grows warm and milky and soon deposits an oil. It is heated 10 minutes on the steam bath and then left for two days at room temperature. The acetone is distilled under vacuum and the residue treated with water to give a white precipitate. This may be recrystallized from water to give 2-(benzoyltauryl)-aminopyridine, melting point 181°–182°.

Twenty-six parts of 2-(benzoyltauryl)aminopyridine is refluxed with 500 parts of 5% sodium hydroxide solution for 4 hours. The solution is adjusted to pH 8–9 and filtered from insoluble material. On lowering the pH further to pH 6–7, using hydrochloric acid, unchanged starting material settles out. At a pH of about 2.0, benzoic acid is precipitated. The filtrate is concentrated to dryness after acidification. The residue is extracted with 500 parts of boiling absolute ethanol. Precipitation occurs slowly from the cooled solution and is helped by scratching the sides of the flask. The precipitate may be recrystallized from ethanol to give 2-taurylaminopyridine hydrochloride, melting at 168°–170°.

14.8 parts of 2-taurylaminopyridine hydrochloride is mixed with an equivalent quantity of sodium hydroxide solution and the solution concentrated under vacuum to dryness. The residue is dissolved away from sodium chloride by the minimum quantity of boiling ethanol and on cooling a precipitate comes down very slowly. The product, 2-taurylaminopyridine, may be recrystallized to finally give a melting point of about 153°–155°.

10.2 parts of 2-taurylaminopyridine and 13.3 parts of dl-pantolactone are mixed and heated at 120°–130° C. for 3 hours. The mixture is dissolved in 50 cc. absolute ethanol and treated with Darco for ½ hour while hot. The cold filtrate was diluted with anhydrous ether to the point of cloudiness and refrigerated. A small amount of yellowish gum separates. The solution is decanted into another flask and more anhydrous ether added to the point of cloudiness. A white crystalline precipitate is obtained slowly and increased by scratching the sides of the flask. This may be recrystallized from ethanol without difficulty. The pure dl-2-(pantoyltauryl)aminopyridine melts at about 142°.

Example 2

A mixture of 475 parts of glacial acetic acid, 142 parts of anhydrous potassium acetate and 169.6 parts of taurine is refluxed with stirring for ten minutes. To the boiling suspension is added 214 parts of phthalic anhydride and the reaction mixture heated under reflux with stirring for 2½ hours. During this period, the solution becomes almost free of undissolved solids followed by a precipitation of crystalline product. The mixture is then cooled in an ice bath for 2 hours and filtered. After washing on the funnel with two successive portions of 50 parts of cold acetic acid and three portions of 100 parts of 2B ethanol, the product is dried at 100°. A yield of 357 parts of the potassium salt of phthaloyltaurine results. When recrystallized from 720 parts of boiling water, 323 parts of pure product is obtained.

A stirred suspension of 196 parts of the potassium salt of phthaloyltaurine in 800 parts of dry benzene is treated with 125 parts of phosphorus pentachloride and the resultant mixture refluxed for one hour. An additional 135 parts of phosphorus pentachloride is then added and the refluxing continued for an additional ½ hour. The benzene and most of the phosphorus oxychloride are removed by vacuum distillation from a warm water bath. The partially crystalline residue is stirred with 1000 parts of ice water and the resultant solid crude product filtered. After washing with several portions of cold water it is recrystallized from ethylene dichloride. Phthaloyltaurylchloride, melting at 157°–160°, is obtained.

A stirred solution of 48.8 parts of 2-aminopyridine in 154 parts of pyridine is cooled in an ice bath and treated portionwise in the course of one-half hour with 70 parts of phthaloyltauryl chloride. The temperature is kept below 12° for an additional one-half hour and the reaction completed by stirring for 1½ hours at room temperature. The reaction mixture is then poured into 1,000 parts of water. The light yellow crystalline product is filtered and washed on the funnel with 500 parts of hot water. It is removed from the funnel and refluxed with 300 parts of absolute ethanol. The resultant hot suspension is filtered, yielding 80.5 parts of almost white product of melting point 214–216°. Recrystallization from butanol gives pure 2-(phthaloyltauryl)aminopyridine melting at 214–216°.

A boiling suspension of 168 parts of 2-(phthaloyltauryl)-aminopyridine in 1250 parts of 95% ethanol is treated with 32 parts of an 85% hydrazine hydrate solution. The mixture is heated under reflux for 3 hours. A clear solution is obtained in 15 minutes followed shortly by a heavy white precipitate. The ethanol is removed by distillation, and the crystalline residue suspended in 1000 parts of hot water and acidified with 46 parts of concentrated hydrochloric acid. After cooling, 78 parts of phthalhydrazide is filtered off. The filtrate is vacuum distilled to dryness, and the solid residue of crude 2-taurylaminopyridine hydrochloride refluxed with 300 parts of absolute ethanol. The mixture is cooled and filtered, yielding 127 parts of 2-taurylaminopyridine hydrochloride.

A solution of 112 parts of the crude hydrochloride in a mixture of 230 parts of methanol and 30 parts of water is refluxed and treated with 223 parts of 2.09M methanolic potassium hydroxide. The precipitate of potassium chloride is filtered from the hot solution. The filtrate is seeded and refrigerated, yielding 83 parts of 2-taurylaminopyridine sufficiently pure for synthetic purposes. The pure material may be obtained by recrystallization from 95% ethanol, melting point 152.5°–154° (cor.).

A mixture of 29.8 parts of 2-taurylaminopyridine and 39.0 parts of $d(-)$ pantolactone is heated for 90 minutes in an oil bath at 105°. With continuous stirring, the tauryl compound dissolves in the molten lactone within 15 minutes. After the addition of 100 parts of absolute ethanol, the mixture is heated to boiling to completely dissolve the melt. The solution is seeded and cooled for 2 hours. The crystalline product is filtered and washed with 40 parts of absolute ethanol followed by 200 parts of ether. When dry a yield of 30 parts of product, M. P. 121–4° unc., is obtained. One recrystallization from a mixture of 1000 parts of ethyl acetate and 50 parts of absolute ethanol gives 28 parts of pure $d(+)$-2-(pantoyltauryl)aminopyridine, having a melting point of 122.5–124.5° (cor.). In 95% ethanol, $(\alpha)_D^{25} = +25.0°$ ($C=2.35$).

Example 3

To a solution of 8.2 parts of metallic potassium in 280 parts of absolute ethanol is added 50.0 parts of 2-taurylaminopyridine. When the mixture is refluxed a clear solution results. After the addition of 44.5 parts of $d(-)$ pantolactone, the solution is boiled for 4 hours. After distilling off 80 parts of ethanol, the cooled solution is neutralized with 12.8 parts of glacial acetic acid, seeded and placed in the refrigerator. The 32 parts of crude product so obtained is washed carefully on the funnel with 20 parts of cold absolute ethanol and recrystallized from 75 parts of the some solvent. The resultant 26.5 parts of $d(+)$-2-(pantoyltauryl)aminopyridine is pure as shown by its melting point and optical rotation.

A reaction time of 5 days at room temperature in place of the 4 hours of refluxing may be substituted in the above example with no loss in yield.

Example 4

Dropwise addition of 8.1 parts of acetic anhydride to a stirred suspension of 10 parts of $d(+)$-2-(pantoyltauryl)aminopyridine in 12 parts of anhydrous pyridine results in an increase in temperature of the mixture to 70° C. A clear solution is obtained which is heated for 2 hours in an oil bath at 75°. The cooled solution is treated with 20 parts of absolute ethanol and the mixture concentrated by vacuum distillation from a water bath at 70°. Three additional portions of 10 parts each of absolute ethanol are added and similarly distilled off. Seeding during this process leads to a white crystalline residue. The crude product is pulverized under 20 parts of cold water and filtered. The resultant 10.3 parts of crude product is purified by recrystallizing twice from 40 parts of water. The 9.1 parts of pure diacetate of $d(+)$-2-(pantoyltauryl)aminopyridine thus obtained melts at 133–134.5° (cor.) and shows $(\alpha)_D^{26°}=+15.2°$ (C=1.00) in 95% ethanol.

Example 5

A stirred suspension of 54.5 parts of 2-aminopyrimidine in 175 parts of dry pyridine is treated portionwise in the course of 40 minutes with 78.0 parts of phthaloyltauryl chloride. The temperature of the reaction mixture rises from 22° C. to 37° C. and is maintained at 40° C. for an additional 20 minutes. After stirring for an additional 4 hours at room temperature the mixture is poured into 1200 parts of cold water. The crude product is filtered and washed with hot water and methanol. The 53 parts of light yellow crude 2-(phthaloyltauryl)-aminopyrimidine is sufficiently pure for synthetic work. When recrystallized from dilute acetic acid, a pure sample melting at 251–3° (cor.) is obtained.

A mixture of 108 parts of 2-(phthaloyltauryl)-aminopyrimidine, 16.5 parts of an 85% aqueous hydrazine hydrate solution, and 800 parts of 95% ethanol is stirred and refluxed for 4 hours. The alcohol is removed by distillation and the resultant crystalline residue suspended in a mixture of 200 parts of water and 540 parts of 0.61M hydrochloric acid. The cooled suspension is filtered to remove phthalhydrazide and the filtrate concentrated to a crystalline residue of crude 2-taurylaminopyrimidine hydrochloride. Upon recrystallization from a mixture of 500 parts of absolute ethanol and 100 parts of water, 64 parts of product is obtained. The pure substance melts at 215–218° (cor.) with decomposition.

The free base may be obtained by neutralizing an aqueous solution of the hydrochloride. When recrystallized from water or 95% ethanol it forms a hydrate, melting point 158–160° (cor.) with decomposition.

A solution of 9.35 parts of potassium in 75 parts of absolute ethanol is added dropwise to a boiling suspension of 30 parts of 2-taurylaminopyrimidine hydrochloride in 95 parts of absolute ethanol. After refluxing for one hour, 24.2 parts of $d(-)$ pantolactone is added and the mixture heated for 5 hours. The cooled mixture is filtered to remove potassium chloride. The filtrate is neutralized with 7.5 parts of glacial acetic acid, seeded and refrigerated. There is obtained 20.5 parts of crude product. The crude product when recrystallized from 90% ethanol yields 16.0 parts of $d(+)$-2-(pantoyltauryl)-aminopyrimidine, melting point 186–188° (cor.). It gives $(\alpha)_D^{28°}=+23.7°$ (C=2.83) in water.

Example 6

To a boiling suspension of 45.0 parts of 2-(phthaloyltauryl)aminopyrimidine in 650 parts of glacial acetic acid is added 32.0 parts of bromine dissolved in 100 parts of the same solvent. During this addition which takes 45 minutes a clear solution is obtained, but on boiling for an additional hour, a precipitate of product appears. The evolution of hydrogen bromide has almost ceased at this time. The reaction mixture is cooled and filtered. The crude product is washed with acetic acid and methanol. When dry, 51.0 parts of white product is obtained, melting point 255–260° dec'n. Recrystallization from acetic acid gives 48 parts of 2-(phthaloyltauryl)-amino-5-bromopyrimidine, melting at 261–264° (cor.) with decomposition.

A mixture of 101 parts of 2-(phthaloyltauryl)-amino-5-bromopyrimidine, 800 parts of 95% ethanol, and 12.5 parts of an 85% aqueous hydrazine hydrate solution is stirred under reflux for 4 hours. The resultant white slurry is concentrated to dryness by distilling the alcohol. The crystalline residue is suspended in 800 parts of hot water and acidified with 22 parts of concentrated hydrochloric acid. After stirring for (n) hour on the steam bath, the phthalhydrazide is filtered off. The decolorized filtrate is concentrated under vacuum to dryness. The crystalline residue when refluxed with 500 parts of absolute ethanol, cooled and filtered, yields 65 parts of 2-tauryl-amino-5-bromopyrimidine hydrochloride. A sample is recrystallized from 90% ethanol to give a pure product, melting at 265–267° C. (cor.) with decomposition.

A suspension of 70.5 parts of 2-taurylamino-5-bromopyrimidine hydrochloride in 100 parts of water is treated with 283 parts of 0.78 M aqueous ammonium hydroxide solution. On addition of 100 parts of water and boiling the free base dissolves. On cooling and filtering 45.0 parts of 2-taurylamino-5-bromopyrimidine is obtained, melting point 212–213° dec'n. A pure sample is obtained by recrystallization from water, melting point 214–215° dec'n. (cor.).

Fifty parts of 2-taurylamino-5-bromopyrimidine is added to a refluxing solution of 6.75 parts of potassium in 350 parts of absolute ethanol. A suspension of the potassium salt of the 2-taurylamino-5-bromopyrimidine results. After refluxing with stirring for 40 minutes, 34.7 parts of $d(-)$ pantolactone is added and refluxing continued for 15 hours. The unreacted potassium salt is filtered from the reaction mixture and washed with three portions of absolute ethanol. When dry, 36.5 parts is obtained. The combined filtrate and washings are distilled down to a small volume, dissolved in 100 parts of water and acidified with 5 parts of acetic acid. The 17.0 parts of crude product is collected.

By suspension of the unreacted potassium salt in alcohol and repetition of the above reaction, a crude yield of 37.5 parts of product is obtained, leaving 9.0 parts of unreacted potassium salt. The crude product when recrystallized twice from 550 parts of water gives 30 parts of $d(+)$-2-(pantoyllauryl)-amino-5-bromopyrimdine, melting point 185–187° (cor.), $(\alpha)_D^{23°}=+23.8°$ (C=0.40) in $H_2O$.

Example 7

A solution of 5.4 parts of 3,5-dibromoaniline in 20 parts of dry pyridine is stirred and cooled in an ice bath. In the course of one hour, 4.19 parts of phthaloyltauryl chloride is added. The red reaction mixture is stirred for one hour at 0° C. and for an equal time at room temperature. The thick slurry is poured into 180 parts of water containing 20 parts of concentrated hydrochloric acid. The crude product is filtered and washed with water. Suspension in 100 parts of methanol removes most of the red impurity. The crude 8.52 parts of product is purified by solution in hot dilute sodium hydroxide. The alkaline solution is decolorized by charcoal, filtered and after acidification with acetic acid, precipitated by refluxing for 90 minutes. The white product, 7.93 parts, is sufficiently pure for further synthetic work. Recrystallization from acetic acid gives pure phthaloyltauryl-3,5-dibromoaniline, melting at 208–210° C.

A mixture of 50 parts of phthaloyltauryl-3,5-dibromoaniline, 6.5 parts of an 85% aqueous hydrazine hydrate solution, and 400 parts of absolute ethanol, is boiled under reflux with stirring for 3 hours. After distilling off the alcohol, the crystalline residue is suspended in 160 parts of hot water and acidified with 10 parts of concentrated hydrochloric acid. The phthalhydrazide is filtered off and the warm filtrate decolorized with charcoal. On addition of 30 parts of concentrated hydrochloric acid to the solution followed by cooling, 40 parts of tauryl-3,5-dibromoaniline hydrochloride separates. The dry hydrochloride is dissolved in 100 parts of hot water and the solution neutralized with concentrated ammonium hydroxide. The free base, 34.1 parts, is collected and recrystallized from a mixture of 100 parts of water and 30 parts of ethanol, yielding 32.5 parts of tauryl-3,5-dibromoaniline, melting point 144–149° unc. Recrystallization from ethylene dichloride gives a pure product, melting at 155–156° C. (cor.).

To a solution of 2.31 parts of potassium in 130 parts of absolute ethanol, is added 21.74 parts of tauryl-3,5-dibromoaniline. The resultant mixture forms a clear solution when heated to the boiling point. After the addition of 13.0 parts of $d(-)$ pantolactone, the solution is refluxed for 5 hours, neutralized with 3.84 parts of acetic acid, and the alcohol distilled off. The viscous gummy residue is refluxed for 10 minutes with 100 parts of water to remove excess lactone and potassium acetate. After cooling, the aqueous upper phase is decanted. The oily lower phase is dried by solution in two portions of absolute ethanol which are removed by vacuum distillation. The residue is dissolved in a boiling mixture of 70 parts of ethylene dichloride and 110 parts of chloroform. On cooling, 20.7 parts of crude product is obtained. It may be recrystallized twice from 320 parts of a mixture of equal parts of ethylene dichloride and chloroform, yielding 18.0 parts of pure $d(+)$ pantoyltauryl-3.5-dibromoaniline, melting point 120–122° C. (cor.). It shows $(\alpha)_D^{26°} = +27.0°$ (C=1.00) in 95% ethanol.

dl-Pantoyltauryl-3,5-dibromoaniline may be prepared by a similar procedure. A pure sample melts at 87°–9° C. (cor.).

Example 8

A solution of 12.2 parts of 2-aminoquinoline in 70 parts of dry pyridine is stirred and cooled in an ice bath. Addition of 24.6 parts of phthaloyltauryl chloride results in a heavy precipitate. It is necessary to add an additional 30 parts of pyridine plus 70 parts of chloroform to get a stirrable reaction mixture. After stirring for 45 minutes at ice bath temperature, the mixture is allowed to warm up to room temperature for an additional 90 minutes. It is then heated at 60° C. for 30 minutes, cooled, and poured into 500 parts of water containing 90 parts of concentrated hydrochloric acid. The crude product, 18.8 parts, obtained by filtration, is recrystallized from 80 parts of acetic acid yielding light yellow crystals. Suspension in hot methanol, followed by filtration, gives 15.5 parts of an almost white product. An additional crystallization from acetic acid gives pure 2-(phthaloyltauryl)-aminoquinoline, melting at 200–203° C. (cor.).

A mixture of 20.3 parts of 2-(phthaloyltauryl)-aminoquinoline, 2.7 parts of an 85% aqueous solution, and 160 parts of 95% ethanol is stirred and refluxed for 3 hours. The alcohol is distilled off leaving a crystalline residue which is suspended in 150 parts of hot water and acidified with the minimum amount of concentrated hydrochloric acid. After filtration to remove phthalhydrazide, the solution is concentrated to a gummy residue by vacuum distillation. Two successive portions of absolute alcohol are added and removed under vacuum. The crystalline residue is refluxed with 200 parts of absolute ethanol. After cooling the suspension and filtering, 14.0 parts of crude 2-taurylaminoquinoline hydrochloride is obtained. It is converted to the free base by treatment with 90 parts of 0.5 M sodium hydroxide solution. The free base is filtered off, washed twice with water and dried. The crude yield of 11.2 parts is combined with a similar crude. The total of 15.4 parts of 2-taurylaminoquinoline is recrystallized from 200 parts of 95% ethanol, using charcoal. A yield of 10.1 parts of almost pure product, melting point 173–5° C., results. Recrystallization gives a pure produce, melting point 177–179° C. dec'n. (cor.).

A mixture of 4.78 parts of 2-taurylaminoquinoline and 4.96 parts of $d(-)$ pantolactone is heated with stirring for 90 minutes at a bath temperature of 105° C. The clear viscous melt is dissolved in a warm mixture of 40 parts of ethyl acetate and 5 parts of absolute ethanol. The solution is treated with charcoal to remove a yellow color. The colorless filtrate is cooled and added dropwise to 1000 parts of ether which is stirred vigorously. The product precipitates as an amorphous solid in the form of small white friable particles. It is filtered, washed with ether, and dried in a vacuum desiccator by overnight evacuation over $P_2O_5$ at 1.0 mm. pressure. The 4.5 parts of $d(+)$-2-(pantoyltauryl)-aminoquinoline obtained in the form of a free-flowing friable white powder, changes to a tacky mass on exposure to atmospheric moisture or on heating. $\alpha_D^{26°} = +25.9°$ (C=2.97) in 95% ethanol.

Example 9

2-amino-5-bromopyridine (42 parts) is suspended in 84 parts of dry pyridine and the mixture is stirred in an ice bath during the addition of 55 parts of phthaloyltauryl chloride over 40 minutes. The red mixture is stirred ½ hour longer in the cold. The product slowly crystallizes. After standing 1¼ hours longer without cooling, the mixture is diluted with water, and the product filtered off, washed with water, and dried. This gives 73 parts of crude 2-(phthaloyltauryl)-amino-5-bromopyridine (89% of theory). It can be recrystallized in good yield from 75–100% acetic acid, with decolorization by activated charcoal. The pure product melts at 205–206° C. (cor.).

2-(phthaloyltauryl)-amino-5-bromopyridine (44 parts) is suspended in 320 parts of 95% ethanol, and 6.7 parts of hydrazine hydrate (85%) is added. The mixture is refluxed on a steam bath with good stirring for 3 hours. The solvent is distilled in vacuo, and the residue taken up in 600 parts of water. The mixture is acidified with hydrochloric acid, warmed 10 minutes on a steam bath, chilled and filtered. The filtrate is decolorized with activated charcoal, and concentrated by distillation in vacuo to a thick syrup. This crystallizes spontaneously, giving 31 parts of the hydrochloride of 2-taurylamino-5-bromopyridine (91% of theory). It can be recrystallized from absolute ethanol. The pure material melts at 166–8° C. (cor.).

The hydrochloride is readily convertible to the free base by treatment in water solution with one equivalent of alkali.

2-taurylamino-5-bromopyridine (33.6 parts) is added to a solution of potassium ethoxide from 4.45 parts of potassium and 350 parts of absolute ethanol. Refluxing the mixture on a steam bath dissolves most of the solid. $d(-)$Pantolactone (23.4 parts) is added with stirring. The solution is refluxed for 3½ hours on a steam bath, and allowed to stand overnight. The solvent is distilled in vacuo, and the gummy residue taken up in 400 parts of water. The solution is decolorized with activated charcoal, and acidified to pH 3. After thorough chilling, the crystalline precipitate is filtered off and dried. Recrystallization from 750 parts of hot water, with the use of activated charcoal, gives 33 parts of white crystalline $d(+)$-2-(pantoyltauryl)-amino-5-bromopyridine (67% of theory), melting point 159–160° C. (cor.). The pure compound melts at 160.0–0.5° C. (cor.). $a_D^{30°}=+42°$ (C=1.00% in 95% ethanol).

*Example 10*

2-amino-5-chloropyridine (35 parts) is suspended in 94 parts of dry pyridine and the mixture is held at 10° and stirred well during the addition of 68.5 parts of phthaloyltauryl chloride over 12 minutes. The mixture is stirred 15 minutes more at 10° C. The product then crystallizes. It is allowed to stand without cooling for 2½ hours more. The mixture is diluted with water and the red product filtered off and washed thoroughly with water and with alcohol, removing most of the color. There remains 82 parts of 2-(phthaloyltauryl)amino-5-chloropyridine (89% of theory). It can be recrystallized from 50–60% acetic acid (1 part in 25 parts of solvent) with the use of activated charcoal, to give a good recovery of white crystalline material. The pure product melts at 198–9° C. (cor.).

2-(phthaloyltauryl)amino-5-chloropyridine (44 parts) is suspended in 360 parts of 95% ethanol, and 7.4 parts of hydrazine hydrate (85%) is added. The mixture is refluxed on a steam bath with good stirring for 3 hours. The solvent is then distilled in vacuo, and the residue taken up in 750 parts of water. The mixture is acidified with hydrochloric acid, warmed 10 minutes on a steam bath, chilled, and filtered. The filtrate is concentrated by vacuum distillation to a thick syrup. Residual water is removed by adding and distilling alcohol. After standing in the cold with absolute alcohol, the residue crystallizes. It is filtered off and dried giving 32 parts of the hydrochloride of 2-taurylamino-5-chloropyridine (98% of theory). It can be recrystallized from absolute ethanol. The pure material melts at 156–8° C. (cor.).

The hydrochloride is readily convertible to the free base by treatment in water solution with one equivalent of alkali.

2-taurylamino-5-chloropyridine (35.4 parts) is added to a solution of potassium ethoxide from 5.57 parts of potassium and 300 parts of absolute ethanol. Warming gives complete solution. $d(-)$ Pantolactone (29.2 parts) is added, and the clear solution is refluxed for 4 hours on a steam bath, then allowed to stand overnight. The solvent is distilled in vacuo, and the gummy residue taken up in 450 parts of water. The solution is clarified with activated charcoal, then chilled and acidified to pH 3. After thorough chilling, the white crystalline product is filtered off and recrystallized from 750 parts of hot water, using activated charcoal. Slow cooling gives good crystals. There is thus obtained 40 parts of white crystalline $d(+)$-2-(pantoyltauryl)amino-5-chloropyridine (73% of theory). The pure compound melts at 156–7° C. (cor.); $(\alpha)_D^{30°}=+35°$ (C=1.00% in 95% ethanol).

*Example 11*

Beta-naphthylamine (10.6 parts) is dissolved in 34 parts of dry pyridine, and the solution stirred in an ice bath during the addition of 22.4 parts of phthaloyltauryl chloride over 25 minutes. The dark mixture is stirred 1 hour longer in the cold, then 4 hours without cooling. Several volumes of water are added and the mixture stirred well. The dark crude product is filtered off, washed with water, and dried, giving 28.8 parts. This is recrystallized from 1000 parts of hot glacial acetic acid, with the use of activated charcoal. Good washing of the recrystallized product with 200 parts of alcohol leaves 19 parts of light brown crystalline 2-(phthaloyltauryl)aminonaphthalene (67% of theory). Further recrystallizations from 80–100% acetic acid gives a white product. The pure compound melts at 236–7° C. (cor.).

2-(phthaloyltauryl)aminonaphthalene (20.9 parts) is suspended in 170 parts of 95% ethanol, and 3.4 parts of hydrazine hydrate (85%) is added. The mixture is refluxed on a steam bath with good stirring for 3 hours, and allowed to stand overnight. The solvent is removed by vacuum distillation and the residue taken up in 200 parts of water. The mixture is acidified with hydrochloric acid, warmed 10 minutes on a steam bath, chilled and filtered. The filtrate is treated with activated charcoal, then chilled and neutralized with sodium hydroxide. The light-colored product is filtered off and dried, giving 12.2 parts (89% of theory). It is dissolved in dilute acid, treated with activated charcoal, and reprecipitated with base. It is then recrystallized from 33% alcohol to give an almost white, crystalline 2-taurylamino-naphthalene. The pure compound, obtained by further recrystallization from 33% alcohol, melts at 163° C. (cor.).

To a solution of potassium ethoxide from 11.8 parts of potassium in 750 parts of absolute ethanol is added 80 parts of 2-taurylamino-naphthalene. The solid dissolves with stirring and refluxing on a steam bath. To the solution is added 63 parts of $d(-)$ pantolactone; this solution is refluxed 3 hours on a steam bath and allowed to stand overnight. The solvent is distilled in vacuo, and the residue taken up in 1750 parts of water. Acid is added to pH 3, and the mixture chilled and filtered, giving 122 parts of crude product (100% of theory). The product is dissolved in dilute base, the solution treated with activated charcoal, and the product reprecipitated with acid. Fractional crystallizations from 25% ethanol give 65 parts of white crystalline d(+)-2-(pantoyltauryl)aminonaphthalene. The pure compound melts at 155–6° C. (cor.); $(\alpha)_D^{30°}=+35°$ (C=1.00% in 95% ethanol).

*Example 12*

N-ethylaniline (27 parts) is dissolved in 85 parts of dry pyridine and stirred well at 25–9° C. during the addition of 55 parts of phthaloyltauryl chloride over 1 hour. The orange mixture is stirred ½ hour longer; a precipitate appears. After standing ½ hour, the mixture is stirred with 1000 parts of water, and the solid filtered off, washed, and dried, giving 68 parts of crude product (95% of theory). Washing with hot water removes most of the color, but little of the product. Recrystallizations from 50% acetic acid gives white crystalline N-(phthaloyltauryl)-N-ethylanilide. The pure compound melts at 150° C. (cor.).

To a suspension of 18.5 parts of N-phthaloyltauryl-N-ethylanilide in 165 parts of absolute alcohol is added 3.2 parts of hydrazine hydrate (85%). The mixture is refluxed on a steam bath with stirring for 2½ hours and allowed to stand overnight. The solvent is removed by vacuum distillation, and the residue suspended in 200 parts of water. The mixture is acidified with hydrochloric acid, warmed 10 minutes on a steam bath, then chilled and filtered. The filtrate is decolorized with activated charcoal, and the solvent removed by vacuum distillation. Alcohol is added and distilled; the residue crystallizes, giving 13.2 parts of light yellow product (96% of theory). Recrystallization from 25% isopropanol in carbon tetrachloride, with the use of activated charcoal, gives white crystalline N-tauryl-N-ethylanilide hydrochloride, melting at 118–9° C. (cor.), with bubbling.

The free base which is a liquid, very soluble in water and alcohol, can be prepared from this product.

To a solution of potassium ethoxide from 11.7 parts of potassium in 1150 parts of absolute ethanol is added 84.2 parts of N-tauryl-N-ethylanilide hydrochloride. The mixture is heated to reflux on a steam bath with stirring, then chilled and filtered. To the filtrate is added 42 parts of d(–) pantolactone and the solution refluxed 2½ hours on a steam bath. After standing overnight the solvent is distilled in vacuo, and the residue seeded. Crystallization proceeds slowly. There is obtained 114 parts of crude d(+)-N-(pantoyltauryl)-N-ethylanilide (100% of theory). Recrystallization from hot water, with the use of activated charcoal, gives a white product melting at 117–8° C. (cor.); $(\alpha)_D^{30°}=+36°$ (C=1.00% in 95% ethanol).

*Example 13*

A suspension of 33.2 parts of 2-(phthaloyltauryl)aminopyrimidine in 425 parts of glacial acetic acid is refluxed and stirred during the addition, through an addition funnel with a long tip, of a solution of 12.8 parts (by weight) of chlorine in 175 parts of glacial acetic acid, over 45 minutes. The mixture is stirred and refluxed ½ hour more, then chilled and the product filtered off. There is obtained 35.5 parts of product (97% of theory). Recrystallizations from glacial acetic acid, with the use of activated charcoal, give a white crystalline 2-(phthaloyltauryl)-amino-5-chloropyrimidine. The pure compound melts at 250–3° C. (cor.).

To a suspension of 24.8 parts of 2-(phthaloyltauryl) amino-5-chloropyrimidine in 200 parts of ethanol is added 4.2 parts of hydrazine hydrate (85%). The mixture is stirred and refluxed on a steam bath for 4 hours. The solvent is distilled in vacuo and the residue taken up in 200 parts of water. The mixture is acidified with hydrochloric acid, warmed 10 minutes on a steam bath, chilled, and filtered. The filtrate is concentrated somewhat by vacuum distillation, then decolorized with activated charcoal and neutralized with sodium hydroxide, with chilling. The product is filtered off and dried; this gives 14.4 parts (90% of theory). Recrystallization from water, with the use of activated charcoal, gives white crystalline 2-taurylamino-5-chloropyrimidine. The pure compound melts at 206–7° C. (cor.) with decomposition.

To a solution of potassium ethoxide from 1.77 parts of potassium and 275 parts of absolute ethanol is added 11.3 parts of 2-taurylamino-5-chloropyrimidine. The mixture is refluxed 45 minutes, and then 10.3 parts of d(–) pantolactone is added. The mixture is refluxed overnight, and the solvent distilled in vacuo. The residue is taken up in 100 parts of 2–3% acetic acid. The product crystallizes spontaneously, and is chilled, filtered off, and dried; there is obtained 12.8 parts of product (73% of theory). Recrystallizations from water, with the use of activated charcoal, gives white crystalline d(+)-2-(pantoyltauryl)amino-5-chloropyrimidine. The pure compound melts at 188–9° C. (cor.); $(\alpha)_D^{30°}=+32°$ (C=1.00% in 95% ethanol).

*Example 14*

A solution of 10.0 parts of p-chloroaniline in 29 parts of dry pyridine is chilled in an ice bath and stirred during the addition of 19.2 parts of phthaloyltauryl chloride over 45 minutes. The red mixture is stirred 1 hour longer in the cold, then 1¼ hours without cooling. It is diluted with water and stirred well. The product is filtered off, washed, dried, and recrystallized from 50% acetic acid, with the use of activated charcoal. There is obtained 18.3 parts of product, melting point 152–4° C. (cor.). Further recrystallizations from 50% acetic acid gives white crystalline phthaloyltauryl-p-chloroanilide. The pure compound melts at 154–5° C. (cor.).

To a suspension of 18.3 parts of phthaloyltauryl-p-chloroanilide in 150 parts of 95% ethanol is added 3.1 parts of hydrazine hydrate (85%). The mixture is stirred and refluxed on a steam bath for 3½ hours. The solvent is removed by vacuum distillation and the residue taken up in 130 parts of water. The mixture is acidified with hydrochloric acid, warmed 10 minutes on a steam bath, chilled, and filtered. The filtrate is decolorized with activated charcoal, and concentrated somewhat by vacuum distillation, then chilled and neutralized with sodium hydroxide. The product is filtered off and dried to give 11.6 parts of crystalline tauryl-p-chloroanilide. Recrystallizations from hot water, with the use of activated charcoal, give a white product. The pure compound melts at 161–2° C. (cor.).

A mixture of 5.9 parts of tauryl-p-chloroanilide and 6.5 parts of d(–) pantolactone is heated in an oil bath at 98–102° with stirring for 2 hours.

It is then cooled and stirred with 25 parts of water containing hydrochloric acid to make the mixture slightly acid. After standing overnight in the cold, the oil partly crystallizes; stirring gives complete crystallization. The product is filtered off, washed, and dried to give 6.5 parts (71% of theory). Recrystallizations from hot benzene, with the use of activated charcoal, gives white crystalline $d(+)$-pantoyltauryl-p-chloroanilide. The pure compound melts at 102–4° C. (cor.); $(\alpha)_D^{30°} = +37°$ (C=1.00% in 95% ethanol).

*Example 15*

A stirred solution of 14.0 parts of aniline in 80 parts of acetone is cooled in an ice bath and treated with 5 parts of phthaloyltauryl chloride in the course of twenty minutes. After the addition of 10 parts of triethylamine and 60 parts of acetone, an additional 15 parts of phthaloyltauryl chloride is added portionwise in the course of thirty minutes, the reaction mixture being maintained at 10° C. The resultant mixture is stirred with cooling for an additional two hours and then allowed to stir for one hour at room temperature. On pouring into 700 parts of water containing 20 parts of concentrated hydrochloric acid, 15.9 parts of crude phthaloyltauranilide melting at 138–140° is obtained. When recrystallized from methanol a pure product, melting point 141–3° C. (cor.) is obtained. Phthaloyltauranilide may also be made by the method described in Example 14, using aniline in place of p-chloroaniline.

Hydrazine cleavage of phthaloytauranilide essentially as described in Example 14 for phthaloyltauryl-p-chloroanilide gives tauranilide. When purified by recrystallization from ethanol it melts at 123–5° C. (cor.).

A mixture of 12.0 parts of tauranilide and 15.6 parts of $d(-)$ pantolactone is heated on an oil bath at 110° for two hours. The hot yellow melt is dissolved in 250 parts of boiling benzene containing 45 parts of ethyl acetate. On cooling and filtering 11.8 parts of crude $d(+)$ pantoyltauranilide, melting at 100–103°, is obtained. Recrystallization from 150 parts of boiling benzene containing 35 parts of ethyl acetate gives 10.8 parts of pure material melting at 106–8° C. (cor.) A 2.7% solution in 95% ethanol shows $(\alpha)_D^{30°} = +40°$.

*Example 16*

The reaction of 54.6 parts of phthaloyltauryl chloride with 23.5 parts of p-toluidine in the presence of 100 parts of dry pyridine according to the procedure in Example 14, results in 68 parts of crude phthaloyltauryl-p-toluidide. Crystalization from 550 parts of 60% acetic acid followed by recrystallization from 550 parts of absolute ethanol gives 39.0 parts of white product. Activated charcoal treatment during recrystallization is desirable. When recrystallized several times from ethanol pure phthaloyltauryl-p-toluidide melting at 168–70° C. is obtained.

A mixture of 39.0 parts of phthaloyltauryl-p-toluidide, 320 parts of 95% ethanol and 6.85 parts of an 85% aqueous hydrazine hydrate solution is stirred and refluxed for three hours. After distilling off the alcohol the residue is dissolved in 250 cc. of hot water and acidified with hydrochloric acid. The cooled solution is filtered to remove phthalhydrazide. The filtrate when concentrated and adjusted to pH 9 with ammonium hydroxide deposits 21 parts of crude tauryl-p-toluidide. Recrystallization from 40 parts of water containing 2 parts of concentrated ammonium hydroxide gives 16.8 parts of purified material. When dissolved in 100 parts of hot absolute alcohol and treated with 15 parts of concentrated hydrochloric acid, 18.7 parts of tauryl-p-toluidide hydrochloride is obtained on cooling. The hydrochloride is suspended in 25 parts of boiling absolute ethanol and treated with a solution of 1.73 parts of sodium in absolute ethanol. After filtering to remove sodium chloride the solution deposits 13.9 parts of tauryl-p-toluidide melting at 125–8°. Several recrystallizations from ethanol gives a pure product melting at 129–130.5° C. (cor.).

A mixture of 10.65 parts of tauryl-p-toluidide and 13.0 parts of $d(-)$ pantolactone is heated in an oil bath at 110° for ninety minutes. The clear melt is dissolved in 250 parts of boiling benzene. When cooled and seeded, 15.4 parts of $d(+)$ pantoyltauryl-p-toluidide is obtained melting at 92–5° C. Two crystallizations from a mixture of 250 parts of benzene and 20 parts of ethyl acetate gives 14.6 grams of pure material melting at 95.5–97° C. (cor.). A 1.24% solution in 95% alcohol shows $(\alpha)_D^{30°} = +39°$.

*Example 17*

A stirred solution of 34.4 parts of sulfanilamide in 108 parts of dry pyridine is cooled in an ice bath and treated portionwise in the course of one hour with 54.6 parts of phthaloyltauryl chloride. After stirring for an hour with cooling the reaction mixture is allowed to stir an additional hour at room temperature. The red slurry is then poured into 1000 parts of ice water containing 110 parts of concentrated hydrochloric acid, yielding crude $N^4$-phthaloyltaurylsulfanilamide. After washing with water, acetic acid and alcohol the 85 parts of crude product is dissolved in 400 parts of boiling water by addition of just sufficient 20% sodium hydroxide to cause solution. Treatment in the hot with activated charcoal removes a colored impurity. The solution is acidified with 70 parts of glacial acetic acid and boiled for 2 hours. The resulting heavy precipitate is filtered from the cooled solution, washed with water and alcohol and dried at 100° C., yielding 66 parts of product melting at 247–254° C. (cor.). A pure sample melting at 250–254° C. (cor.) is obtained by solution of the crude product in dilute hot sodium hydroxide and precipitation with acetic acid.

A mixture of 66.5 parts of $N^4$-phthaloyltaurylsulfanilamide, 500 parts of 95% ethanol and 8.25 parts of an 85% aqueous hydrazine hydrate solution is stirred and heated under reflux for three hours. After removal of the alcohol by distillation, the residue is suspended in 500 parts of hot water and acidified with 20 parts of concentrated hydrochloric acid. Filtration to remove phthalhydrazide followed by concentration of the filtrate yields 47.5 parts of $N^4$-taurylsulfanilamide hydrochloride. It is converted to the free base by solution in 71 parts of hot water and addition of 216 parts of ethanol containing 348 parts of dissolved sodium. The resultant solution is decolorized with activated charcoal, filtered, and cooled to yield 36.5 parts of $N^4$-taurylsulfanilamide. Several recrystallizations from 75% ethanol gives a pure product melting at 185–187° C. (cor.) with decomposition.

A stirred refluxing suspension of 21.2 parts of $N^4$-taurylsulfanilamide in 148 parts of absolute ethanol is treated with a solution of 5.35 parts of potassium in 75 cc. of absolute ethanol. After refluxing for thirty minutes to ensure potassium salt formation, 9.9 parts of dl-pantolactone is added. The reaction mixture is stirred and refluxed for three hours, treated with an additional 9.9 parts of dl-pantolactone and the reaction continued for eleven hours. The alcohol is then almost completely removed by vacuum distillation and the wet crystalline residue dissolved in 75 cc. of water containing 8.4 parts of glacial acetic acid. On refrigeration 5.9 parts of crude product is obtained by filtration. The filtrate is distilled down to two-thirds its former volume to remove alcohol which hinders complete crystallization. On cooling an additional 16.8 parts of crude product is obtained. When the combined crops are recrystallized three times from about 100 parts of boiling water using activated charcoal, 17 parts of pure dl-$N^4$-pantoyltaurylsulfanilamide melting at 166.5–167.5° C. (cor.) is obtained.

*Example 18*

By the procedure of Example 14, 62 parts of p-anisidine and 137 parts of phthaloyltauryl chloride give 173 parts of crude phthaloyltauryl-p-anisidide, which is purified by recrystallization from 33% acetic acid to a melting point of 148–9° C. (cor.).

Continuing the procedure of Example 14, 50.5 parts of phthaloyltauryl-p-anisidide and 8.7 parts of hydrazine hydrate (85%) with 420 parts of 95% ethanol give 29.3 parts of crude tauryl-p-anisidide, which is conveniently purified by dissolving in dilute base, treating with activated charcoal, and reprecipitating with acid. The pure tauryl-p-anisidide melts at 176–7° C. (cor.)

A mixture of 25.3 parts of tauryl-p-anisidide and 28.6 parts of $d(-)$ pantolactone is heated in an oil bath at 110°±2° for 2 hours with stirring. It is then cooled and taken up in 360 parts of ethylene chloride, seeded, and chilled (crystal may first be obtained by rubbing with a glass rod). Filtration and drying gives 31.5 parts of $d(+)$ pantoyltauryl-p-anisidide, which is recrystallized from ethylene chloride to a melting point of 111–12° C. (cor.).

*Example 19*

By the procedure of Example 14, 69 parts of p-nitroaniline and 137 parts of phthaloyltauryl chloride give 148 parts of phthaloyltauryl-p-nitroanilide, melting point 214–15° C. (cor.) which may be further recrystallized to melting point 214.5–15.5° C. (cor.).

By the procedure of Example 14, 13.3 parts of phthaloyltauryl-p-nitroanilide and 2.0 parts of hydrazine hydrate (85%) with 155 parts of 95% ethanol give 8.5 parts of tauryl-p-nitroanilide, melting point 218° C. (cor.) with decomposition, after purification by recrystallization from water.

To a solution of potassium ethoxide from 7.89 parts of potassium and 1300 parts of absolute ethanol is added 54.8 parts of tauryl-p-nitroanilide. The mixture is stirred and refluxed for 30 minutes; then 53.5 parts of $d(-)$ pantolactone is added, and the stirring and refluxing continued for 48 hours. Then the mixture is cooled and 11.5 parts of acetic acid is added. The precipitate is filtered and the filtrate is concentrated to dryness. The residual gum is stirred with water and seeded (crystals may first be obtained by slow evaporation of a water-alcohol solution of the oil); the crystalline precipitate is filtered off and dried, giving 63 parts. It is recrystallized from ethyl acetate or benzene-alcohol to give light yellow $d(+)$ pantoyl tauryl-p-nitroanilide, melting point 152–3° C. (cor.); $(\alpha)_D^{27} = +38°$ (C=1.00% in 95% ethanol).

*Example 20*

A mixture of 41 parts of phthaloyltauryl chloride in 150 parts of acetone is added slowly to 50 parts of benzylamine, with chilling and shaking. The mixture is allowed to stand 1 hour in an ice bath with occasional shaking, and 2 hours at room temperature. It is then poured into 1000 parts of cold water, acidified with acetic acid, and chilled and stirred. The mixture is about neutral. The precipitate crystallizes and is filtered, washed, and dried, giving 28 parts of solid. This is extracted with cold dilute NaOH, filtered, and the filtrate acidified. The precipitate is filtered, washed, and dried, giving 16.8 parts of o-carboxybenzoyltaurylbenzyl amide. This may be recrystallized from benzene-acetic acid to melting point 140–1.5° C. (cor.) and may be used, crude, in the subsequent preparation of tauryl benzylamide. Or it may be converted, by refluxing in 15% acetic acid, to phthaloyltaurylbenzylamide, melting point 117–18° C. (cor.), which may also be used to prepare taurylbenzylamide.

A mixture of 34.4 parts of o-carboxybenzoyltaurylbenzylamide, 6.2 parts of hydrazine hydrate (85%), and 300 parts of 95% ethanol is refluxed 2½ hours. The solvent is removed by vacuum distillation and the residue is taken up in 400 parts of water, acidified with concentrated hydrochloric acid to pH 2–3, heated 10 minutes with stirring, chilled, and filtered. The filtrate is evaporated to dryness to give 23.8 parts of taurylbenzylamide hydrochloride which may be recrystallized from benzene-ethanol to a melting point of 179–81° C. (cor.). This is converted to the free base by heating with an equivalent amount of potassium ethoxide in ethanol, filtering, and concentrating the filtrate to dryness in vacuo. The residue is used directly to prepare $d(+)$-pantoyltaurylbenzylamide.

A mixture of 10.7 parts of taurylbenzylamide and 13.0 parts of $d(-)$ pantolactone is heated and stirred in an oil bath at 60–5° C. for one hour. The clear melt is cooled and extracted with ether; the residue crystallizes. It is extracted with ethylene chloride, filtered, and the filtrate evaporated to dryness. The residue is then recrystallized from benzene to give white $d(+)$ pantoyltaurylbenzylamide, melting point 93.5–4.5° C. (cor.); $(\alpha)_D^{28°} = +34°$ (C=1.00% in 95% ethanol).

We claim:

1. A method of preparing pantoyltauramides which comprises mixing together in a substantially anhydrous alcohol in the presence of a strongly alkaline alkoxide of the group consisting of alkali metal and alkaline earth metal alkoxides, alpha - hydroxy - beta,beta-dimethyl-gamma-butyrolactone and a tauramide having attached to the amide nitrogen thereof a radical of the group consisting of aromatic, heterocyclic and alicyclic radicals and after reaction thereof recovering the resulting pantoyltauramide.

2. A method of preparing pantoyltauramides which comprises mixing together in substantially anhydrous ethyl alcohol, alpha-hydroxy-beta,beta - dimethyl - gamma-butyrolactone, a tauramide having the general formula

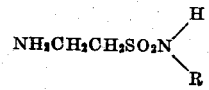

in which R is an aromatic radical and an alkali metal alkoxide and allowing the mixture to react at a temperature between about 20° C. and 80° C. after reaction thereof recovering the resulting pantoyltauramide.

3. Chemical compounds having the formula

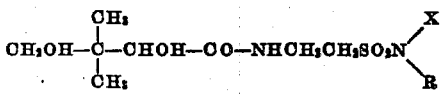

in which X is a radical of the group consisting of hydrogen, cationic salt-forming radicals and alkyl radicals and R is a radical of the group consisting of aromatic, heterocyclic and alicyclic radicals.

4. Chemical compounds having the formula

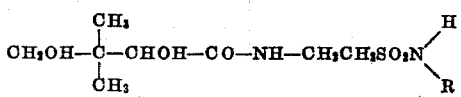

in which R is an aromatic radical of the benzene series.

5. Chemical compounds having the formula

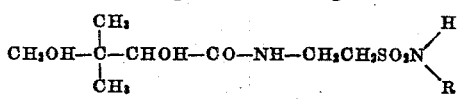

in which R is a halogenated aromatic radical of the benzene series.

6. Chemical compounds having the formula

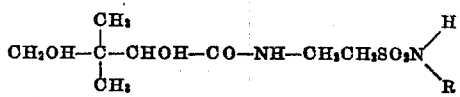

in which

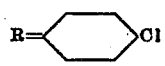

7. Chemical compounds having the formula

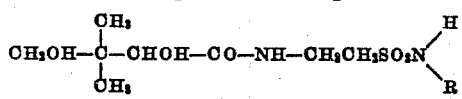

in which R is a nitrogen containing heterocyclic radical.

8. Chemical compounds having the formula

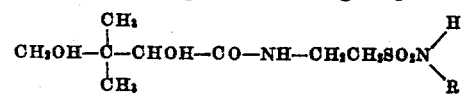

in which R is a heterocyclic radical of the pyridine series.

9. Chemical compounds having the formula

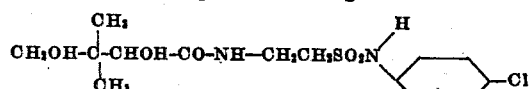

10. Chemical compounds having the formula:

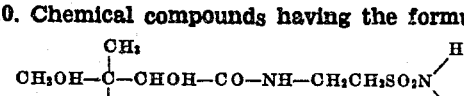

in which R is a heterocyclic radical of the pyrimidine series.

11. Chemical compounds having the formula

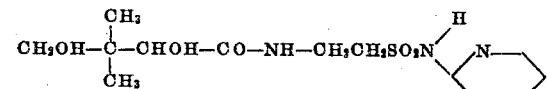

WILBUR H. MILLER.
RICHARD O. ROBLIN, Jr.

REFERENCES CITED

The following references are of record in the file of this patent:

UNITED STATES PATENTS

| Number | Name | Date |
| --- | --- | --- |
| 2,184,279 | Christainsen | Dec. 26, 1939 |
| 2,229,744 | Kern | Jan. 28, 1941 |
| 2,348,425 | Snell | May 9, 1944 |